Feb. 20, 1968     D. L. PLETTE ET AL     3,370,221
FREQUENCY SENSITIVE CURRENT LIMIT
Filed Oct. 13, 1964     2 Sheets-Sheet 1

INVENTOR.
DAVID L. PLETTE AND
SIDNEY T. KYZER
BY *James G. Williams*
THEIR ATTORNEY

United States Patent Office 3,370,221
Patented Feb. 20, 1968

3,370,221
FREQUENCY SENSITIVE CURRENT LIMIT
David L. Plette and Sidney T. Kyzer, Waynesboro, Va., assignors to General Electric Company, a corporation of New York
Filed Oct. 13, 1964, Ser. No. 403,535
9 Claims. (Cl. 322—44)

ABSTRACT OF THE DISCLOSURE

A frequency sensitive current limit for an AC generator is provided. The current supply to the generator field from a source synchronized to the generator frequency is sensed by a current transformer. An inductor coupled across the transformer produces a voltage dependent upon the value of the impedance of the inductor (which is frequency dependent) and the magnitude of the current. This voltage is compared against a reference to produce an error signal which is utilized to control the amount of excitation supplied to the generator field.

BACKGROUND OF THE INVENTION

The invention relates to a current limiter for limiting the current of an alternating current generator to a predetermined magnitude.

A typical alternating current generator has a direct current field winding which is excited or energized to maintain the generator output voltage substantially constant despite a wide variation in the load current drawn from the generator output. In order that the generator be protected from excessive load current and resultant damage, but still supply current to keep equipment operating or to enable fault protectors to operate, the load current is regulated or limited to some magnitude. Prior art regulators use one or more current transformers coupled to the output circuit of the generator to provide a signal indicative of the load current. This signal is supplied to a regulator circuit that supplies current to the generator field winding in accordance with the signal, and hence in accordance with the load current. While desirable limiting or control of load current is obtained with such regulators, the required current transformer or transformers may be excessively or intolerably heavy, particularly for an aircraft.

Accordingly, an object of the invention is to provide a generator current limiter that does not require current transformers coupled to the generator output circuit.

Another object of the invention is to provide a generator current limiter that limits the output current of a generator and that is separate from the generator output circuit.

Another object of the invention is to limit the output current of a generator with a circuit that need not be coupled to the output circuit of the generator.

Since, for a given magnitude of output current, the required exciter field current of an alternating current generator decreases with the generator and exciter frequency or speed, another object of the invention is to provide a current limiter that is responsive to generator speed and that limits the generator output current as a desired function of generator output frequency.

SUMMARY OF THE INVENTION

Briefly, these and other objects of the invention are achieved by a circuit which varies the current supplied to a field winding of a generator. The invention utilizes a source of excitation voltage having a frequency that varies as a function of the generator output frequency. A coupling circuit including a regulator couples the source of excitation voltage to the generator field winding. Sensing means sense the current and frequency of the current in the coupling circuit and produce a control signal in response to the current exceeding a predetermined magnitude for a given frequency. This control signal is applied to the regulator to cause the regulator to limit the current supplied to the generator field winding in response to the control signal and thereby to limit the generator output current.

The invention is particularly pointed out in the claims. The invention may be better understood from the following description given in connection with the accompanying drawing, in which:

DESCRIPTION OF THE INVENTION

Figure 1:
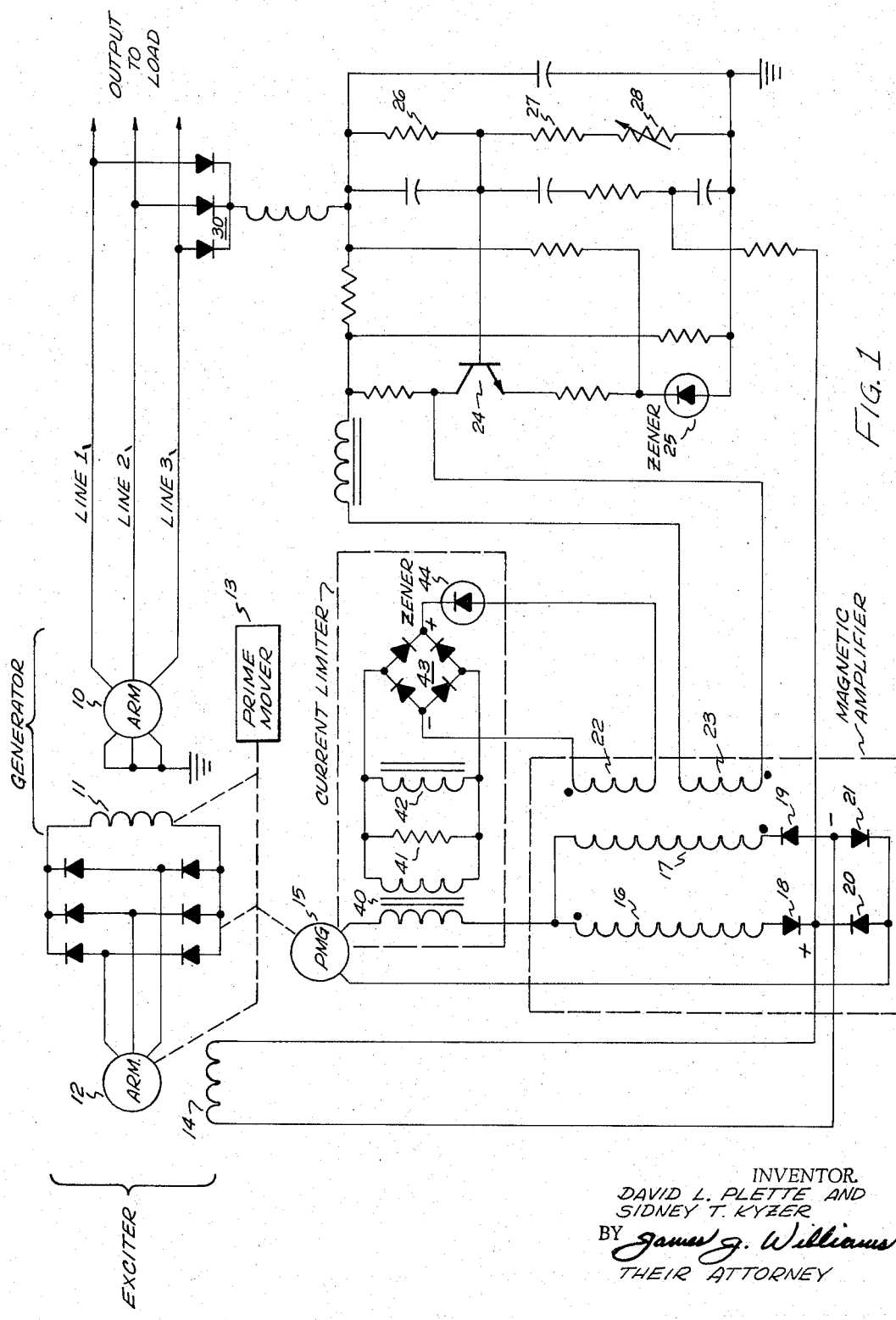
FIGURE 1 shows a circuit diagram of a preferred embodiment of the current limiter of the invention.

In FIGURE 1, the current limiter in accordance with the invention has been shown with a generating system for producing three phase alternating current. This alternating current is produced by a generator which comprises an armature 10 having three stationary output windings coupled in a Y connection. The armature or output windings may be coupled in a delta connection. One end of each of the armature windings is coupled to a neutral or ground, and the other ends are respectively coupled to output lines 1, 2, and 3 which supply alternating current to a load. The generator also comprises a rotating field winding 11 which is excited by direct current from an armature 12 of an exciter. The armature 12 may comprise a plurality of windings which are coupled by a full wave rectifier circuit to the field winding 11. If, as assumed, the generator is a brushless generator, the exciter armature 12, the rectifier circuit, and the field winding 11 are mounted on a common shaft and rotated by a prime mover 13 such as the engine of an airplane, as indicated by the dashed line. The exciter has an excitation winding 14 which is supplied with direct current from a conventional magnetic amplifier shown enclosed in dashed lines. The amount of current in the excitation winding 14 determines the amount of current produced by the exciter armature 12, and this in turn determines the output current produced by the generator. The magnetic amplifier controls or regulates the magnitude of current supplied to the excitation winding 14. In the embodiment shown in FIGURE 1, this current is supplied by a permanent magnet generator 15. The permanent magnet generator 15 is also driven by the prime mover 13 to produce an alternating current having a frequency which varies as a function of the frequency or speed of the main generator.

The permanent magnet generator 15 supplies alternating current to the magnetic amplifier which regulates or limits and rectifies this current and supplies it to the excitation winding 14.

The magnetic amplifier comprises main or gate windings 16, 17, control or reset windings 22, 23, and rectifiers 18, 19, 20, 21. The main windings 16, 17 are coupled to respective cores in a manner indicated by a dot at one end of each winding. Current flow from the dotted end toward the undotted end of any winding tends to saturate the associated core in an arbitrarily designated set direction, and current flow from the undotted end toward the dotted end of any winding tends to saturate the core in the opposite and arbitrarily designated reset direction. Current flows through the main windings 16, 17 at a time during an appropriate half cycle determined by the degree that the core of the magnetic amplifier was reset. The degree of reset is determined by current which is permitted to flow through the two reset windings 22, 23 only from the undotted end toward the dotted end. The reset windings 22, 23 are coupled to both cores of the main windings 16, 17 and are therefore coupled to the main windings 16, 17. During one half cycle of the permanent magnet generator 15, current may flow through the main winding 16, the rectifier 18, the excitation winding 14, and the rectifier 21. During the other half cycle of the permanent magnet generator 15, current may flow through the rectifier 20, the excitation winding 14, the rectifier 19, and the main winding 17.

The control or reset winding 23 of the magnetic amplifier is coupled to a voltage sensing circuit through a transistor 24. The voltage sensing circuit comprises a Zener diode rectifier 25 and a voltage divider comprising a network of three resistors 26, 27, 28. The voltage sensing circuit is supplied with voltage indicative of the voltages on lines 1, 2, and 3 through a rectifier network 30. This rectified voltage is filtered and is applied to the base of the transistor 24. The amount of current conducted by the transistor 24 depends on the relative magnitudes of the voltages on the emitter and base of the transistor 24. This current flows only from the undotted end toward the dotted end of the control winding 23, and determines the amount that the magnetic amplifier is reset.

Figure 2:
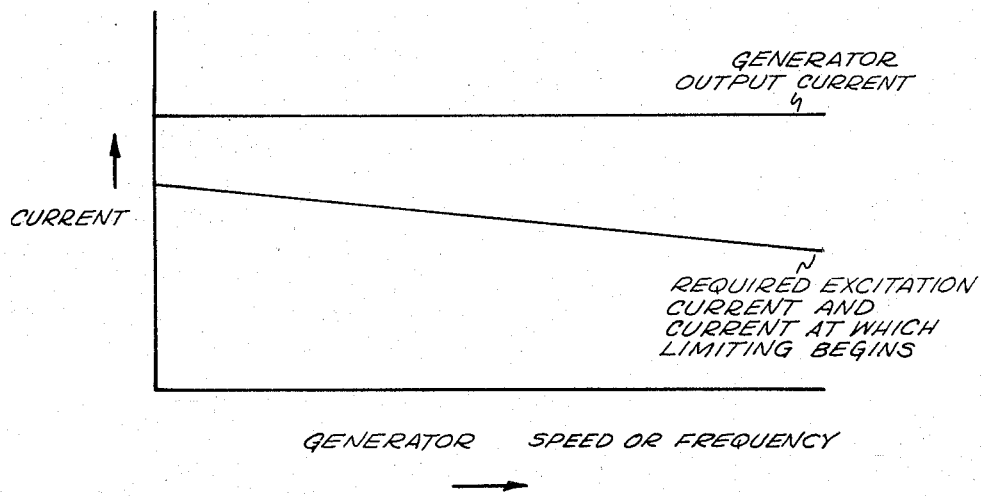
FIGURE 2 shows graphs for explaining the operation of a portion of the circuit shown in FIGURE 1.

The current limiter of the invention is shown enclosed in dashed lines. This current limiter comprises a single current transformer 40 which has its primary winding coupled in series with one of the lines between the permanent magnet generator 15 and the magnetic amplifier. The secondary winding of the current transformer 40 may be provided with a shunt resistor 41 and inductance 42. The secondary winding is also coupled to a full wave bridge rectifier 43 comprising four diode rectifiers. The positive output terminal of the rectifier 43 is coupled through a Zener diode rectifier 44 in the breakdown direction to the undotted end of the control or reset winding 22. The dotted end of the control winding 22 is coupled to the negative terminal of the rectifier 43. In accordance with the invention, current of a predetermined magnitude in the primary winding of the current transformer 40 causes the rectifier 43 to produce sufficient voltage to overcome the reference voltage provided by the Zener diode 44 and cause reset current to flow through the control winding 22. This reset current flows from the undotted end toward the dotted end of the control winding 22 and limits the current which can be provided by the magnetic amplifier, and therefore limits the current provided to the excitation winding 14 and to the field winding 11 of the generator. It will be understood that an increase above a predetermined magnitude in current supplied to the excitation winding 14 causes an increases in reset current in the control winding 22 and an increase in limiting. Thus, the output current supplied by the generator is also limited. For a given current magnitude condition, if the frequency of the alternating current produced by the permanent magnet generator 15 increases, the voltage across the inductance 42 also increases. This increase may overcome the reference voltage provided by the Zener diode 44 and limit the output current produced by the generator. In this connection, FIGURE 2 shows graphs relative to generator speed or frequency for a constant generator output current, and for the required excitation current to produce the constant generator output current, which is also the current at which limiting begins. Since the excitation current decreases with generator speed and still produces the same generator output current, the magnitude at which the current is limited should decrease at the same rate. In other words, the current limiter should be frequency sensitive. The inductance 42 provides such frequency-sensitive limiting that varies at the same rate as the required excitation current. The exact frequency characteristics of the current limiter can be adjusted by a change in the relative values of the resistor 41 and the inductance 42.

OPERATION OF THE INVENTION

A typical operating condition for the invention will be described. Assume that the prime mover 13 is operating at a relatively constant frequency and that additional load is placed on the generator. This additional load causes the voltage on lines 1, 2, and 3 to decrease so that the control winding 23 resets the main windings 16, 17 less. Thus, the magnetic amplifier provides additional current to the excitation winding 14 to meet this increased load. This excitation current comes from the permanent magnet generator 15. If the load demand causes the current supplied to the magnetic amplifier and the excitation winding 14 by the permanent magnet generator 15 to exceed a predetermined magnitude determined by the characteristics of the current limiter, the control winding 22 causes additional resetting of the magnetic amplifier and limits or holds the current supplied to the magnetic amplifier and the excitation winding 14 to this predetermined magnitude. If the prime mover 13 varies in speed, as it might if it were the engine of an aircraft which changes speed during flight, the frequency produced by the permanent magnet generator 15 also changes. This frequency change produces a voltage change across the inductance 42 that varies as a function of the frequency. As the frequency increases, the current limiter begins to provide current through the control winding 22 for lower magnitudes of current supplied to the magnetic amplifier. Thus, the current limiter provides a current limit magnitude which decreases with increasing frequency so that the excitation current for the excitation winding 14 is held to a predetermined magnitude that decreases with frequency.

It will thus be seen that the invention provides a novel and improved current limiter which limits excitation current to a predetermined magnitude and which also limits excitation current to a predetermined magnitude that decreases with increasing frequency of a prime mover. The invention provides a current limiter which does not require the relatively heavy and expensive current transformers on the output lines 1, 2, and 3. The circuit of FIGURE 1 may be modified. For example, the permanent magnet generator 15 and the magnetic amplifier may be coupled directly to the field winding 11. Other generators or sources which respond to the prime mover and generator speed could be substituted for the permanent magnet generator 15. The inductance 42 could be built into the current transformer 40 by the use of an air gap in the core of the current transformer 40 or by the use of a powdered iron core or similar methods. And the transformer 40 can be coupled to other circuit points such as between the magnetic amplifier and the excitation winding 14. While the invention has been described with reference to a particular embodiment, it is to be understood that modifications may be made without departing from the spirit of the invention or from the scope of the claims.

What we claim as new and desire to secure by Letters Patent of the United States is:

1. A current limiter for use with an alternating current generator having at least one output winding excited by a field winding comprising a first alternating current generator operated at a rate proportional to the speed of said alternating current generator; a current regulator having a main circuit and a control circuit for limiting the current flow through said main circuit in response to a signal applied to said control circuit; circuit means coupling said main circuit between said first generator and said field winding; a current limiter having an input circuit coupled to said circuit means, having a voltage reference circuit, having a frequency sensing circuit, and having an output circuit for producing an output signal in response to current and frequency in said input circuit, said output signal having a magnitude that is proportional to the magnitude of said input current in excess of the voltage magnitude of said voltage reference circuit; and means coupling said output circuit of said current limiter to said control circuit of said current regulator for applying said output signal to said current regulator and limiting the current magnitude in said main circuit as a function of the magnitude of said output signal.

2. A current limiter for an alternating current generator having an output winding and a field winding comprising an independent alternating current generator having a frequency proportional to the speed of said alternating current generator; a magnetic amplifier having main windings and at least one control winding; circuit means coupling said main windings to said independent generator; rectifier means coupling said main windings to said field winding; a transformer coupled to said circuit means; an inductance and resistance coupled to the output of said transformer; a rectifier coupled to the output of said transformer; a voltage reference device coupled to said rectifier; and means coupling said voltage reference device to said control winding so that current in said control winding tends to limit the current in said main windings.

3. In a generator system in which an output winding supplies current as a function of the current supplied to a field winding, a current limiting circuit comprising an independent source of alternating current; regulating means coupled in a circuit between said source of alternating current and said field winding for providing current from said source of alternating current to said field winding; means coupled to said circuit for sensing the magnitude and frequency of the current therein and producing a signal in response to said current exceeding a predetermined magnitude and in response to said frequency; and means coupling said sensing means to said regulating means for limiting the current supplied by said regulating means to said field winding in response to said signal.

4. In an AC generator excitation system including a field winding for said generator, an independent source of AC having a frequency proportional to generator speed, current regulator means coupling said source of AC to said field, said current regulator means including a rectifier for rectifying the current supplied to said field, and control means for adjusting the amount of current supplied to said field; a current limit comprising
   means for deriving a current whose magnitude and frequency are proportional to the current supplied to said field,
   frequency sensitive means for establishing a voltage proportional to said derived current and to the frequency thereof,
   voltage reference means coupled to said frequency sensitive means for producing a signal proportional to the voltage of said frequency sensitive means which exceeds a magnitude determined by said voltage reference means, and
   means coupling said signal to the control means of said current regulator means to adjust the amount of current supplied to said field.

5. A current limit as recited in claim 4 wherein said frequency sensitive means includes a reactance whose impedance changes with frequency.

6. In an AC generator excitation system including a field winding for said generator, an independent source of AC having a frequency proportional to generator speed, current regulator means coupling said source of AC to said field, said current regulator means including a rectifier for rectifying the current supplied to said field, and control means for changing the amount of current supplied to said field; a current limit comprising
   input means coupled to said source of AC to derive a voltage proportional to the magnitude and frequency of the current supplied to said field, and
   voltage reference means coupled to said input means for producing a signal proportional to the voltage of said input means which exceeds the magnitude determined by said voltage reference means,
   said signal being coupled to the control means of said current regulator means for limiting the amount of current supplied to said field.

7. The current limit recited in claim 6 wherein said input means is a current transformer the core of which has substantial leakage reactance.

8. An AC generator excitation system comprising a field winding for said generator,
   an exciter generator,
   common drive means for said generator and said exciter generator such that the output frequency of said exciter generator is proportional to the output frequency of said generator,
   current regulator means coupling said exciter generator to said field,
   said current regulator means including a rectifier for rectifying the current supplied to said field, and
   control means for adjusting the amount of current supplied to said field,
   a current limit coupled to said exciter generator, said current limit including
   a transformer coupled to the output of said exciter generator for deriving a current proportional in magnitude and frequency to the current supplied to said field,
   a reactance having an impedance that varies with frequency coupled across said transformer for developing a voltage in response to the magnitude and frequency of the derived current, and
   voltage reference means coupled to said reactance for producing a signal proportional to the voltage developed by said reactance which exceeds a magnitude determined by said voltage reference means,
   said signal being coupled to the control means of said current regulator means for limiting the amount of current supplied to said field.

9. In an AC generator excitation system having a separate source of AC proportional to generator frequency, control means for applying excitation to said generator, and regulating means coupling said source of AC to said control means; a current limit comprising
   input means responsive to the current supplied to said control means for developing a voltage whose magnitude is a function of the current supplied to said control means and its frequency, and
   voltage reference means coupled to said input means for producing a signal proportional to the voltage developed by said input means which exceeds a magnitude determined by said voltage reference means,
   said signal being coupled to said regulating means to limit the amount of current applied to said control means.

References Cited

UNITED STATES PATENTS

| 2,066,919 | 1/1937 | West | 322—79 X |
| 2,906,940 | 9/1959 | Burt | 322—100 X |
| 2,979,652 | 4/1961 | Breedon et al. | 322—100 X |
| 3,105,185 | 9/1963 | Miron | 322—100 X |

MILTON O. HIRSHFIELD, *Primary Examiner.*

R. V. LUPO, *Assistant Examiner.*